(12) United States Patent
Rohrweck

(10) Patent No.: US 8,897,447 B1
(45) Date of Patent: Nov. 25, 2014

(54) BURST TETHERING FOR MOBILE COMMUNICATION DEVICES

(75) Inventor: Florian Rohrweck, Ebensee (AT)

(73) Assignee: Google Inc., Mountain View, CA (US)

(*) Notice: Subject to any disclaimer, the term of this patent is extended or adjusted under 35 U.S.C. 154(b) by 303 days.

(21) Appl. No.: 13/465,630

(22) Filed: May 7, 2012

(51) Int. Cl.
*H04K 1/00* (2006.01)

(52) U.S. Cl.
USPC ............................................ 380/270

(58) Field of Classification Search
CPC .................... H04L 63/0272; H04W 76/00
See application file for complete search history.

(56) References Cited

U.S. PATENT DOCUMENTS

| | | | | |
|---|---|---|---|---|
| 7,478,392 | B2 * | 1/2009 | Vargas et al. | 718/102 |
| 7,706,778 | B2 * | 4/2010 | Lowe | 455/411 |
| 2011/0066746 | A1 | 3/2011 | Bennett et al. | |
| 2011/0149086 | A1 | 6/2011 | Winbush, III | |
| 2011/0280220 | A1 | 11/2011 | Jia et al. | |
| 2011/0283001 | A1 * | 11/2011 | Jung et al. | 709/227 |
| 2011/0289238 | A1 | 11/2011 | Holbein et al. | |
| 2011/0294502 | A1 * | 12/2011 | Oerton | 455/426.1 |
| 2012/0158918 | A1 * | 6/2012 | Leblanc et al. | 709/219 |
| 2013/0185210 | A1 * | 7/2013 | Dodson et al. | 705/44 |

* cited by examiner

*Primary Examiner* — Andrew Nalven
*Assistant Examiner* — Mary Li
(74) *Attorney, Agent, or Firm* — McDonnell Boehnen Hulbert & Berghoff LLP

(57) ABSTRACT

A mobile communication device enables data synchronization between a tethered computing device and another computing device over a telecommunications network. The communication device includes a network interface configured for connection to the network to establish a network connection and another network interface configured for connection to the tethered device to establish a series of tethered connections and permit the tethered device to use the network connection. The communication device includes a processor configured to receive information from the tethered device during a first tethered connection and to determine, in response, a parameter associated with a synchronization period during which the tethered device may use the network connection to synchronize data between the tethered device and the another computing device. The processor is configured to establish a synchronization wireless access point responsive to the parameter through which the tethered device can establish a second tethered connection to access the network connection.

15 Claims, 4 Drawing Sheets

BURST TETHERING FOR MOBILE COMMUNICATION DEVICES

TECHNICAL FIELD

This disclosure relates to mobile communication devices and, in particular, to a device that enables synchronization of data between a tethered computing device and another computing device over a telecommunications network using the mobile communication device.

BACKGROUND

Oftentimes, computing devices such as laptop computers, tablet computers and similar devices are not configured for cellular communication and lack the authority and/or the ability to directly access a telecommunications network on their own. Instead, these devices are often configured for only short-range wireless communication and rely on free wireless hotspots that are provided at hotels, restaurants or other establishments that employ Wi-Fi or similar communication protocols to obtain access to networks such as the public Internet. In many locations, however, free wireless hotspots are unavailable. In these locations, a cell phone or other mobile communications device configured for cellular communication can be used to establish a form of mobile hotspot and other computing device can be tethered to the communication device.

BRIEF SUMMARY

A mobile communication device in accordance with one embodiment of the present teachings includes a first network interface configured for connection to a telecommunications network to establish a network connection with the telecommunications network. The device further includes a second network interface configured for connection to a tethered computing device to establish a series of tethered connections with the tethered computing device and permit the tethered computing device to use the network connection. The device further includes a processor configured to generate a first set of credentials. The process is further configured to receive a first request from the tethered computing device to establish a first tethered connection of the series of tethered connections and to establish the first tethered connection if the first request includes the first set of credentials. The processor is further configured to receive a first set of information from the tethered computing device during the first tethered connection and to determine, responsive to the first set of information, a first parameter associated with a first synchronization period during which the network connection is utilizable by the tethered computing device to synchronize data between the tethered computing device and another computing device connected to the telecommunications network. The first parameter comprises a start time for the first synchronization period. The processor is further configured to establish a first synchronization wireless access point responsive to the first parameter through which the tethered computing device is permitted to establish a second tethered connection of the series of tethered connections to access the network connection.

An article of manufacture in accordance with one embodiment of the present teachings includes a computer storage medium having a computer program encoded thereon that when executed by a processor in a mobile communication device enables synchronization of data between a tethered computing device and another computing device over a telecommunications network using a mobile communication device, the mobile communication device including a first network interface configured for connection to the telecommunications network to establish a network connection with the telecommunications network and a second network interface configured for connection to the tethered computing device to establish a series of tethered connections with the tethered computing device and permit the tethered computing device to use the network connection. The computer program including code for receiving a first set of information from the tethered computing device during a first tethered connection of the series of tethered connections and determining, responsive to the first set of information, a first parameter associated with a first synchronization period during which the tethered computing device may use the network connection to synchronize data between the tethered computing device and the another computing device connected to the telecommunications network. The first parameter comprises a start time for the first synchronization period. The computer program further includes code for establishing a first synchronization wireless access point responsive to the first parameter through which the tethered computing device can establish a second tethered connection of the series of tethered connections to access the network connection.

A method in accordance with one embodiment of the present teachings for enabling synchronization of data between a tethered computing device and another computing device over a telecommunications network using a mobile communications device, the mobile communication device including a first network interface configured for connection to the telecommunications network to establish a network connection with the telecommunications network and a second network interface configured for connection to the tethered computing device to establish a series of tethered connections with the tethered computing device and permit the tethered computing device to use the network connection includes several steps. The method includes the step of receiving a first set of information from the tethered computing device during a first tethered connection of the series of tethered connections. The method further includes the step of determining, responsive to the first set of information, a first parameter associated with a first synchronization period during which the tethered computing device may use the network connection to synchronize data between the tethered computing device and the another computing device connected to the telecommunications network, the first parameter comprising a start time for the first synchronization period. The method further includes the step of establishing a first synchronization wireless access point responsive to the first parameter through which the tethered computing device can establish a second tethered connection of the series of tethered connections to access said network connection.

A mobile communication device accordance with the present teachings is advantageous because the device enables more efficient synchronization of data between a tethered computing device and another computing device over a telecommunications network. The device enables synchronization without requiring extensive user intervention for each synchronization attempt and also reduces battery losses and excessive data transfers relative to synchronization schemes in conventional devices.

The foregoing and other aspects, features, details, utilities and advantages of the present teachings will be apparent from reading the following description and claims, and from reviewing the accompanying drawings.

DETAILED DESCRIPTION OF EMBODIMENTS

Figure 1:
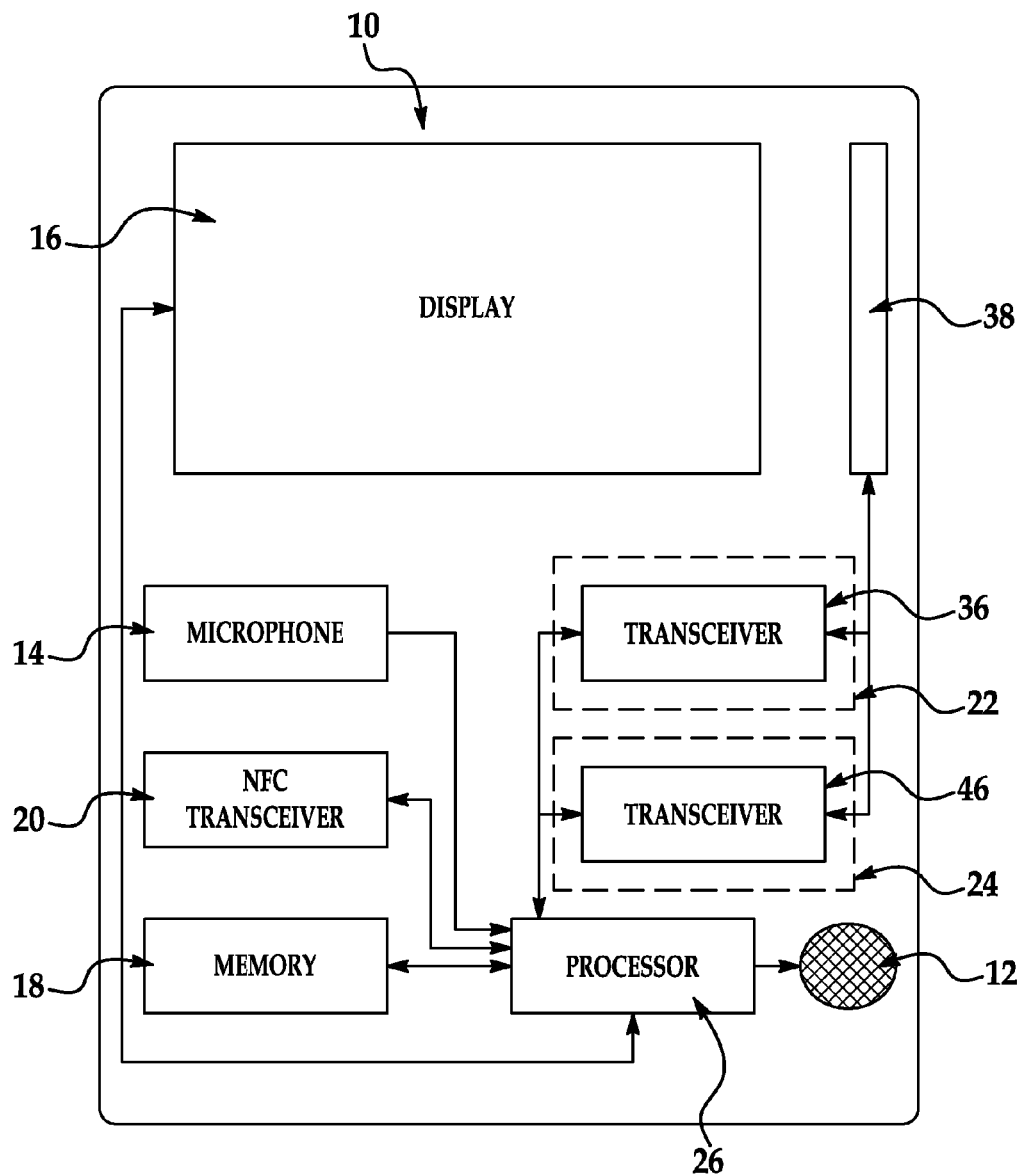
FIG. 1 is a diagrammatic view of a mobile communication device in accordance with one embodiment of the present teachings.

Referring now to the drawings wherein like reference numerals are used to identify identical components in the various views, FIG. 1 illustrates a mobile communication device 10 in accordance with one embodiment of the present teachings. In the illustrated embodiment, device 10 comprises a cellular phone. It should be understood, however, that device 10 may comprise any of a wide variety of devices configured for wireless communication with a cellular or other telecommunications network through which device 10 may maintain communication with the network despite changes in location of device 10 including, for example, tablet or laptop computers with wireless transceivers built in or connected thereto. Device 10 may include cellular phone components including, for example, a speaker 12, a microphone 14, a display 16, and a memory 18. Although not illustrated, device 10 may further include components such as a battery and power management and signal processing circuitry. In accordance with one embodiment of the present teachings, device 10 may include a near field communications (NFC) transceiver 20. In accordance with present teachings, device 10 may also include a pair of network interfaces 22, 24 and an electronic control unit or processor 26.

Speaker 12 includes electric to acoustic transducer that generates sound in response to electrical signals indicative of audio communications. Microphone 14 includes an acoustic to electric transducer that converts sound or mechanical vibration to electrical signals.

Display 16 functions as an input/output device for the user of device 10. Display 16 may comprise, for example, a liquid crystal display or light emitting diode display. Display 16 provides a graphical user interface (GUI) to the user. Display 16 may function as only an output device with input received through other I/O devices such as a keyboard. Alternatively, display 16 may also function as an input device and may comprise a touch screen display including, for example capacitive and resistive touch screen displays.

Memory 18 is provided for storage of data and instructions or code (i.e. software) for processor 26. In accordance with one embodiment of the present teachings, memory 18 may include a computer program encoded thereon for enabling synchronization of data between a tethered computing device and another computing device over a telecommunications network using device 10. Memory 18 may comprise various forms of non-volatile memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 18 may be internal to processor 26.

NFC transceiver 20 enables device 10 to exchange wireless communications with another device having its own NFC transceiver over relatively short distances in accordance with standards promoted by the International Organization for Standardization, International Electrotechnical Commission and the NFC Forum including the standards referred to as ISO/IEC 18092 and ISO/IEC 21481. Transceiver 20 may comprise both an NFC transmitter and an NFC receiver. As discussed hereinbelow, in accordance with one embodiment of the present teachings, transceiver 20 transmits credentials to a computing device to enable the computing device to connect with device 10. For this purpose, it should be understood that transceiver 20 may alternatively comprise only a transmitter and that the transmitter may comprise an active (powered) element or a passive (unpowered) element such as an NFC tag.

Figure 2:
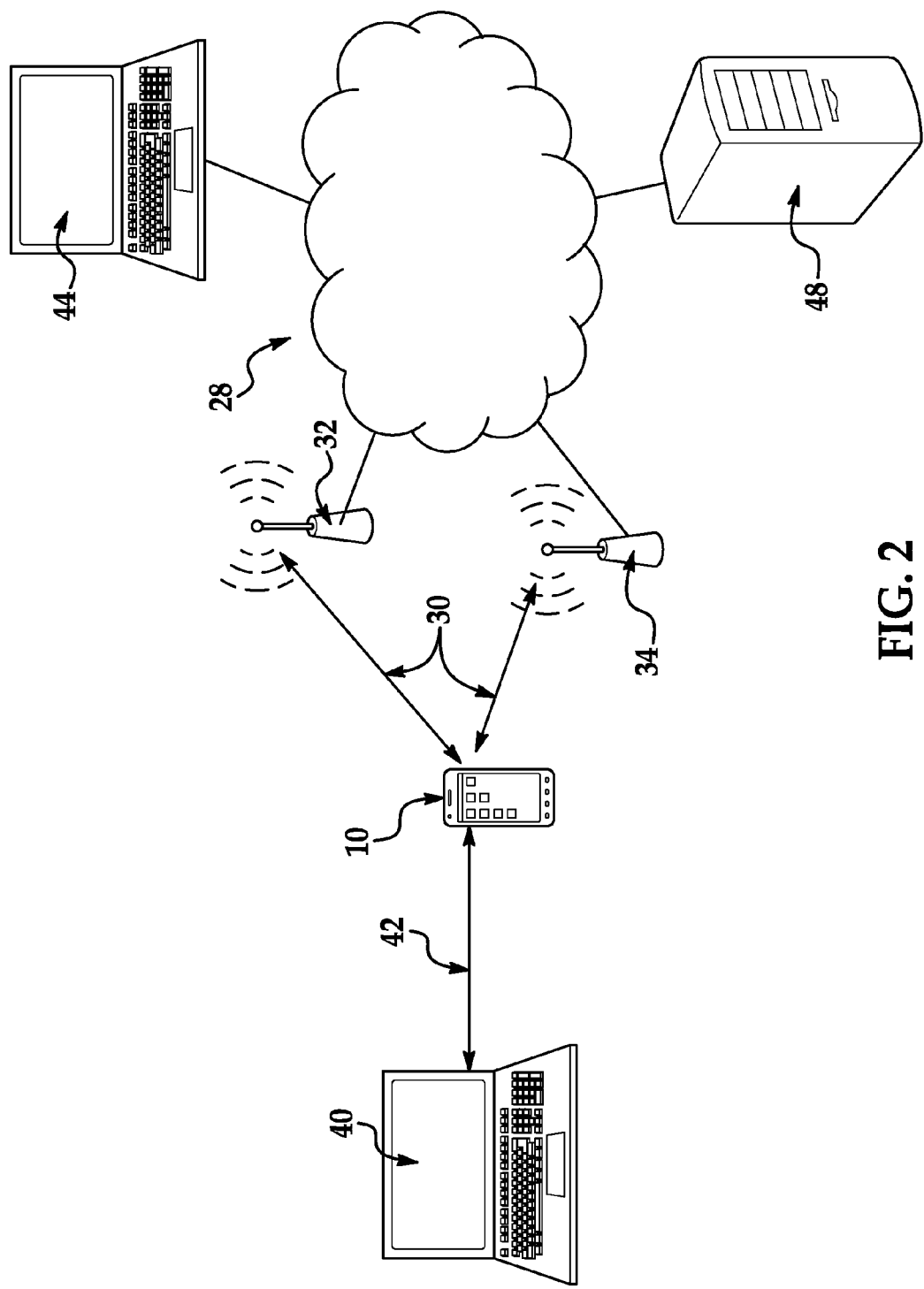
FIG. 2 is a diagrammatic view of the mobile communication device of FIG. 1 illustrating connections to a telecommunications network and a tethered computing device.

Referring to FIG. 2, network interface 22 is configured for connection to a telecommunications network 28 to establish a network connection 30 with the network 28. Network 28 may comprise a cellular telecommunications network made available by a wireless provider and accessible by device 10. Network 28 may further comprise the public internet, a local area network (LAN), wide area network (WAN), virtual private network (VPN) or other form of telecommunications network and network 28 may comprise an intranet or extranet. Device 10 may access network 28 using one or more access points such as cellular base stations 32, 34 which may themselves be connected to a mobile telephone switching center that routes voice and data transmissions between device 10 and telephone landlines and network servers (not shown). Referring again to FIG. 1, network interface 22 may comprise a wireless network interface controller having a radio transceiver 36. Transceiver 36 is provided to transmit signals to and receive signals from an antenna 38 for wireless communication with network 28. Transceiver 36 may communicate with access points 32, 34 using communication topologies including frequency, time and code division multiple access topologies (i.e. FDMA, TDMA, CDMA).

Referring again to FIG. 2, network interface 24 is configured for connection to a tethered computing device 40 to establish a tethered connection 42 with the tethered computing device 40. Device 10 acts as a wireless modem for tethered computing device 40 and permits device 40 to access and use network connection 30 through device 10 through which device 40 can communicate with another computing device 44 to synchronize data. Tethered computing device 40 and computer device 44 may each comprise a personal computing device such as a desktop, laptop or tablet computer as shown in the illustrated embodiment, but it should be understood that tethered computing device 40 may take on a wide variety of forms. Device 44 may, for example, comprise a server as described in greater detail hereinbelow such as an email server or a database or file server. The data synchronized between tethered computing device 40 and computing device 44 may comprise any of a wide variety of data used in a variety of applications. For example, devices 40 and 44 may synchronize data relating to electronic mail messages, calendar entries, contact information, folders and files. Referring again to FIG. 1, tethered connection 42 may be a wireless connection and network interface 24 may again comprise a wireless network interface controller having a radio transceiver 46. Transceiver 46 may be similar to transceiver 36, but may be configured to short range wireless communication using short-range wireless technologies such as Wi-Fi (IEEE 802.11), Bluetooth, Zigbee, NFC, etc. Transceiver 46 may transmit and receive signals using antenna 38 or another antenna (not shown). Tethered connection 42 may also be a wired connection and network interface 24 may include a network interface controller having a connector (not shown) through which device 10 may be connected to tethered computing device 40 using, for example, a USB cable.

Processor 26 is provided to control components of device 10, including network interfaces 22, 24, to enable synchronization of data between tethered computing device 40 and computing device 44 over telecommunications network 28. Processor 26 may comprise one or more programmable microprocessors or microcontrollers. Processor 26 may include a central processing unit (CPU), memory (such as memory 18) and an input/output (I/O) interface through which processor 26 may receive a plurality of input signals including signals generated by microphone 14, display 16 and transceivers 20, 36, 46 and generate a plurality of output signals including those used to control and/or provide data to speaker 12, display 16 and transceivers 20, 36, 46.

In accordance with the present teachings, processor 26 may be configured with programming instructions from a computer program (i.e., software) to perform all or part of a method for enabling synchronization of data between tethered computing device 40 and computing device 44 over telecommunications network 28. The program may be stored in a computer storage medium such as memory 18 (which again may be internal to processor 26 or external to processor 26 as illustrated in FIG. 1). The program may be pre-installed in a computer storage medium on device 10 or may be obtained from a computer storage medium external to device 10. For example, processor 26 may download the program from another computing device such as application server 48 over network 28. As used herein, the term "server" refers to a computing device coupled to a network such as network 28 and configured by programming instructions (i.e., software) to provide services to other computing devices (including other servers). The server may include an operating system such as one of the operating systems based on the Linux or UNIX operating systems. The server may also include an internal memory or database which may employ a database management system (DBMS) and may be configured to provide a static and dynamic contact structure for the server and used to provide both intermediate information while the server executes operations and long-term storage of data. The server may further include applications that configure the server to perform specific functions based on the intended user of the server. The applications may be implemented using software development components and may further include a combination of JavaScript, VB Script and ASP (Active Server Pages) and other software components to provide required functionality. The server may also include an interface to provide a graphical and communications interface between the server and clients such as device 10. The interface may, for example, be configured to be eXtensible Markup Language (XML) or Simple Object Access Protocol (SOAP) compliant.

Figure 3A:
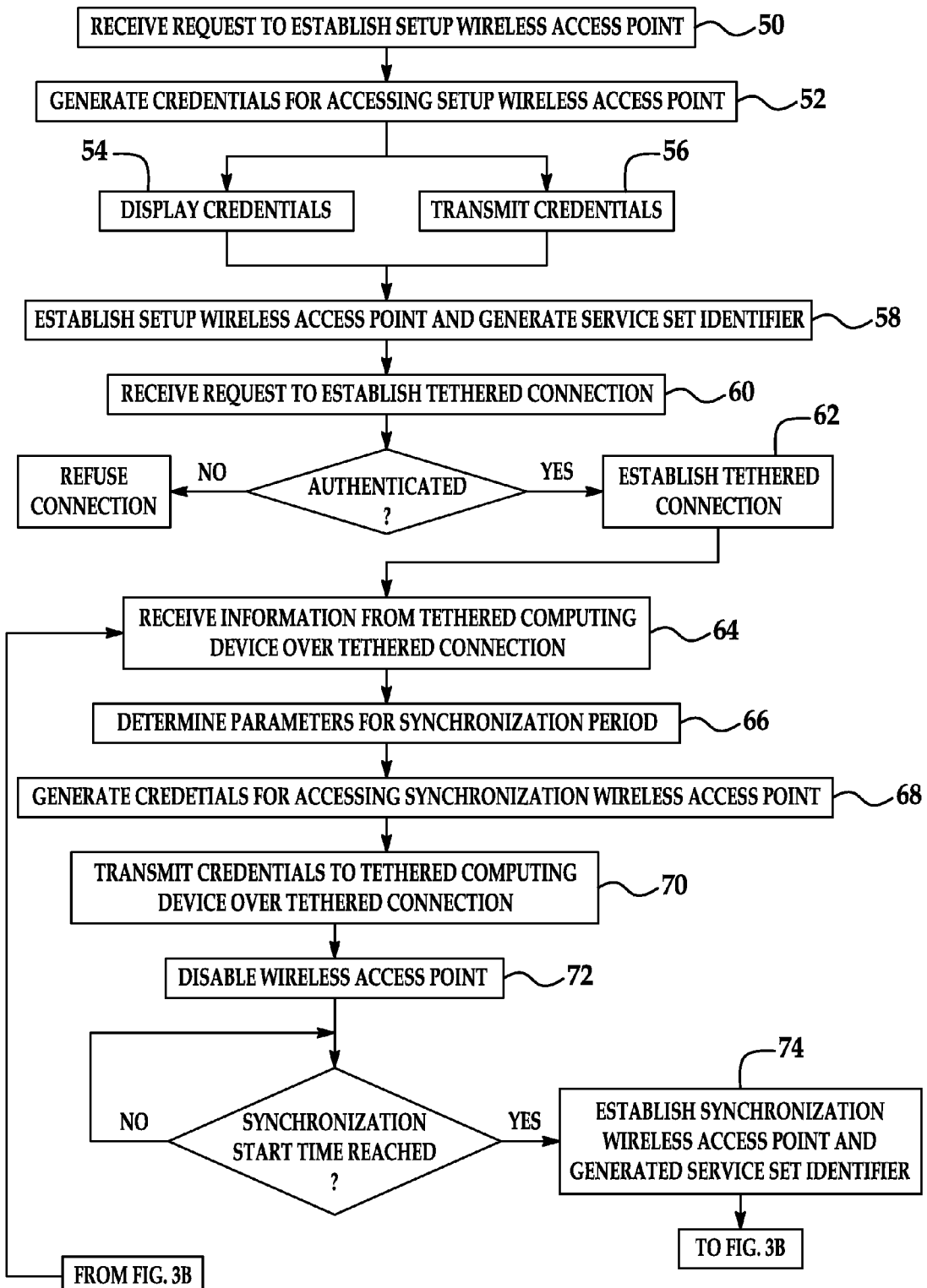
FIGS. 3A-B are flowcharts illustrating one embodiment of a process for enabling synchronization of data between a tethered computing device and another computing device over a telecommunications network using a mobile communication device in accordance with the present teachings.
Figure 3B:
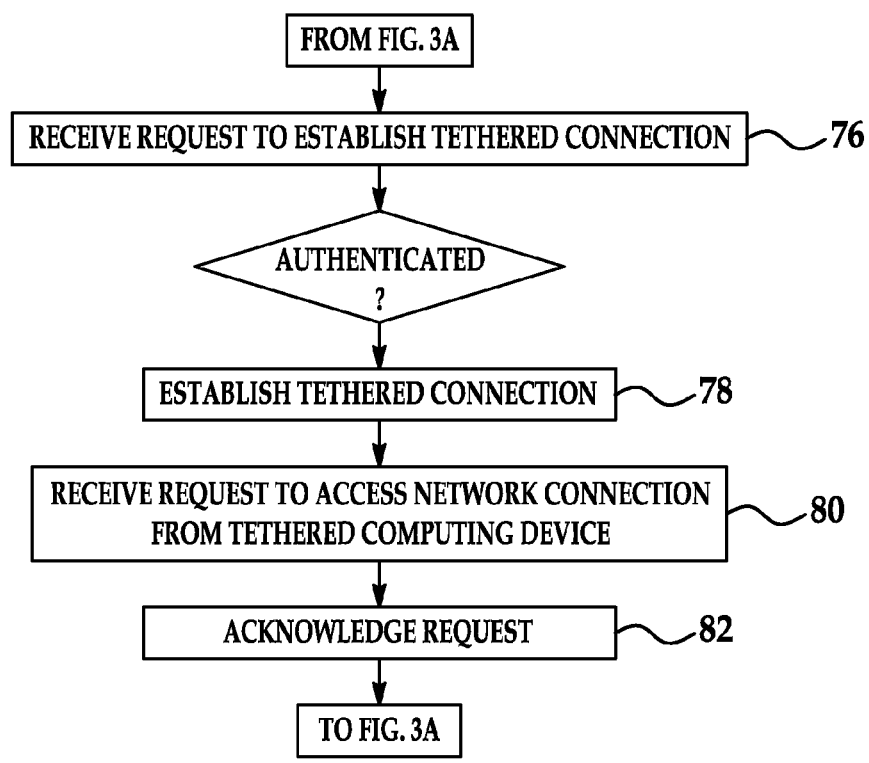

Referring now to FIGS. 3A-B, the operation of processor 26 and device 10 in accordance with one embodiment of the present teachings is illustrated. Device 10 may begin with the process 50 of receiving a request to establish a setup wireless access point which may cover a geographic area within which a device such as device 40 is capable of accessing network 26 through device 10 using short-range wireless technologies such as Wi-Fi (IEEE 802.11). The request may be entered by a user through a graphical user interface embodied in display 16 or another input element on device 10 (e.g., by selecting an icon on display 16 that launches an application to tether devices 10 and 40). Alternatively, the request may result from a transmission made by device 40 or be inferred from an attempt to connect devices 10 and 40 (including, e.g., by connection of a cable between devices 10 and 40 in a wired connection).

In response to the request, processor 26 may initiate a process 52 to generate a set of credentials that are configured for use by device 40 in authenticating device 40 and establishing a tethered connection between devices 10 and 40. As used herein, credentials refer to any data or information that may be used by device 10 to identify or authenticate device 40. The credentials may comprise, for example, a user identifier and a password. Device 10 may provide credentials to device 40 in a variety of ways. In one embodiment, processor 26 implements a process 54 that displays credentials on display 16 such that a user of device 40 can record the credentials and/or enter the credentials into device 40. In one embodiment, the credentials may be embodied in a quick response (QR) code that can be captured by a camera on device 40. In another embodiment, processor 26 implements a process 56 that transmits the credentials to device 40 using NFC transceiver 20.

Also in response to the received request to establish a tethered connection, processor 26 may initiate a process 58 to establish a setup wireless access point. Processor 26 further generates a service set identifier (SSID) for the setup wireless access point which may form part of the credentials provided to device 40.

Processor 26 may continue with the process 60 of receiving a request from tethered computing device 40 to establish a tethered connection 42. The request from device 40 will typically include the credentials provided to device 40 earlier. Processor 26 may compare the credentials received from device 40 to the credentials generated in process 52 and, if the credentials agree, may continue with the process 62 of establishing the tethered connection 42 between devices 10 and 40. The connection may be established through transmission of data to device 40 and receipt of similar data from device 40 relating to negotiation of various communication parameters for connection 42.

Once the connection 42 is established, processor 26 may implement a process 64 of receiving information from tethered computing device 40 over connection 42. The information may include various types of information relevant to establishing a subsequent schedule for subsequent connections 42 over which synchronization of data between device 40 and device 44 using device 10 may occur. For example, the information may include the type or volume of data for which synchronization is requested and the frequency with which synchronization needs to occur.

In response to the information received from device 40 over connection 42, processor 26 may implement a process 66 to determine one or more parameters associated with a subsequent synchronization period during which device 40 will access network connection 30 through device 10 and use connection 30 to synchronize data between device 40 and device 44 over network 28. The parameters may include, for example, start and stop times for the synchronization period (or a duration for the synchronization period) and a data transfer limit during the synchronization period. Processor 26 may determine these parameters based on the needs of device 40 as indicated by the information received from device 40 during process 64, the limitations associated with the network connection 30 between device 10 and network 28 (e.g., available bandwidth, data transfer limits imposed by a wireless service provider, etc.), and the needs of device 10 for use of connection 30. For example, if device 10 is being used for a voice call or is downloading an application or streaming video, device 10 may adjust the parameters for the synchronization period to limit use of connection 30 by device 40. Similarly, if the connection 30 has a limited bandwidth, device 10 may also adjust the parameters to limit use of connection 30 by device 40. On the other hand, if device 10 is not being used for any other functions, and/or there is significant bandwidth in connection 30 and/or there is an indication of an urgent request to synchronize data from device 40, processor 26 may adjust the parameters to allow greater use of connection 30 by device 40. It should be appreciated that this description is meant to be exemplary and that a variety of algorithms could be developed to determine values for the parameters. The parameters, and particularly the start time for the synchronization period, may be transmitted to device 40 over tethered connection 42 so that device 40 is aware of the time period(s) during which device 40 can use network connection 30 to synchronize data with device 44.

In addition to determining parameters for a subsequent synchronization period, processor 26 may perform the processes 68, 70 of generating another set of credentials and transmitting the credentials to device 40 over tethered connection 42. The credentials generated in process 68 will typically be different than those generated during process 52 so that the prior credentials (which in some embodiments are displayed on display 16 as described above) cannot be used by other users/devices to access network connection 30 through device 10.

Once the parameters for the synchronization period have been determined by processor 26, processor 26 may perform the process 72 of disabling the setup wireless access point. Subsequently, processor 26 may initiate, at the indicated start time for the synchronization period, a process 74 to establish a synchronization wireless access point through which tethered computing device 40 can establish another tethered connection 42 with device 10 to access network connection 30. Processor 26 again generates a service set identifier (SSID) for the synchronization wireless access point which may again form part of the credentials provided to device 40 during process 70.

With the synchronization wireless access point established, processor 26 listens for a request from device 40 to establish another tethered connection 42 with device 10. Using the previously negotiated parameters for the synchronization period, and particularly the start time for the synchronization period, device 40 preferably requests establishment of the tethered connection substantially contemporaneous with establishment of the synchronization wireless access point by device 10. The request from device 40 will again typically include the credentials provided to device 40 earlier in process 70. Accordingly, once the process 76 of receiving a request from device 40 to establish connection 42 is completed, processor 26 may compare the credentials received from device 40 to the credentials generated in process 70 and, if the credentials agree, may continue with the process 78 of establishing another tethered connection 42 between devices 10 and 40. The connection 42 may again be established through transmission of data to device 40 and receipt of similar data from device 40 relating to negotiation of various communication parameters for connection 42. Once connection 42 is established, processor 26 may implement the processes 80, 82 of receiving a request to access network connection 30 from tethered computing device 40 over tethered connection 42 and generating an acknowledgement of the request to device 40 over connection 42 so that device 40 can begin using network connection 30. Processor 26 may further be configured to receive information from device 40 regarding the status of efforts to synchronize data between device 40 and device 44.

In accordance with one aspect of the present teachings, processor 26 may further be configured to repeat several of the illustrated processes so that data may be synchronized between devices 40, 44 over a series of synchronization periods. In particular, while connection 42 is established during each synchronization period, processor 26 may again implement the processes 64, 66 of receiving information relevant to establishing the next synchronization period and determining one or more parameters associated with the next synchronization period. Processor 26 may then implement processes 68 through 80 and processes 64 through 80 may be repeated until terminated by the user or a predetermined condition is met.

In order to address the possibility of a missed synchronization period (for example, if device 10 is turned off during the time a previously negotiated synchronization period is scheduled to occur) processor 26 may also determine a standard interval between synchronization periods during each instance of process 66. If the processor 26 determines that a synchronization period has been missed (for example, if device 10 is turned on after a period of being off), processor 26 can initiate process 74 at a time calculated from a parameter indicative of the time for the most recent successful synchronization period (i.e. the most recent period during which synchronization of data occurred) plus a multiple of the selected interval. Device 40 may also be programmed to notify a user if unable to establish a tethered connection 42 with device 10 after a predetermined number of synchronization periods based on the determined interval. If the user elects to continue attempting to establish the tethered connection 42, the user may receive further notifications if device 40 is still unable to establish connection 42 after a predetermined number of synchronization periods based on the determined interval. The credentials generated during process 68 may remain valid until a tethered connection 42 is again established.

A mobile communication device 10 accordance with the present teachings offers several advantages. Device 10 provides access to telecommunications network 26 to computing devices 40 that lack the authority and/or ability to directly access network 26 and may do so when other forms of access (e.g., free Wi-Fi hotspots) are unavailable. Device 10 may also provides access to network 26 while avoiding the cost and additional hardware or software necessary to provide separate access to network 26 to device 40. Device 10 also enables more efficient synchronization of data between device 40 and another computing device 44 over telecommunications network 26. Device 10 enables synchronization without requiring extensive user intervention for each synchronization attempt and also reduces battery losses and excessive data transfers relative to synchronization schemes in conventional devices in which a user typically must establish a hotspot using the mobile communication device, wake up the tethered device, establish a connection between communication device and the tethered device, undertake the synchronization process, and disable the connection and hotspot and then repeat this process over and over again.

Although one or more particular embodiments been shown and described, it will be understood by those of skill in the art that various changes and modifications can be made without departing from the spirit and scope of the present teachings.

What is claimed is:

1. A mobile communication device, comprising:
a first network interface configured for connection to a telecommunications network to establish a network connection with the telecommunications network;
a second network interface configured for connection to a tethered computing device to establish a series of tethered connections with the tethered computing device and permit the tethered computing device to use the network connection; and,
a processor configured to:
generate a first set of credentials;
receive a first request from the tethered computing device to establish a first tethered connection of the series of tethered connections;
establish the first tethered connection if the first request includes the first set of credentials;
receive a first set of information from the tethered computing device during the first tethered connection;
determine, responsive to the first set of information, a first parameter associated with a first synchronization period of a subsequent connection during which the network connection is utilizable by the tethered computing device to synchronize data between the tethered computing device and another computing device connected to the telecommunications network, the first parameter comprising a start time for the first synchronization period;
provide the first parameter of the first synchronization period to the tethered computing device over the first tethered connection;
generate a second set of credentials for the subsequent connection that remain valid for the first synchronization period of the subsequent connection;
provide the second set of credentials to the tethered computing device over the first tethered connection;
disable the first tethered connection;
establish a first synchronization wireless access point responsive to the first parameter through which the tethered computing device establishes a second tethered connection of the series of tethered connections to access the network connection;
receive a second request from the tethered computing device over the first synchronization wireless access point to establish the second tethered connection; and,
establish the second tethered connection if the second request includes the second set of credentials.

2. The mobile communication device of claim 1 wherein the first set of credentials are embodied in a quick response (QR) code.

3. The mobile communication device of claim 1, further comprising a near field communications transceiver configured to transmit the first set of credentials to the tethered computing device.

4. The mobile communication device of claim 1 wherein the processor is further configured to determine a second parameter associated with the first synchronization period, the second parameter comprising a duration of the first synchronization period.

5. The mobile communication device of claim 1 wherein the processor is further configured to determine a second parameter associated with the first synchronization period, the second parameter comprising a data transfer limit during the first synchronization period.

6. The mobile communication device of claim 1 wherein the processor is further configured to:
determine a start time for a second synchronization period during which the tethered computing device uses the network connection to synchronize data between the tethered computing device and the another computing device; and,
establish a second synchronization wireless access point responsive to the start time for the second synchronization period through which the tethered computing device establishes a third tethered connection of the series of tethered connections to access the network connection.

7. An article of manufacture, comprising:
a non-transitory computer storage medium having a computer program encoded thereon that when executed by a processor in a mobile communication device enables synchronization of data between a tethered computing device and another computing device over a telecommunications network using the mobile communication device, the mobile communication device including a first network interface configured for connection to the telecommunications network to establish a network connection with the telecommunications network and a second network interface configured for connection to the tethered computing device to establish a series of tethered connections with the tethered computing device and permit the tethered computing device to use the network connection, the computer program including code for:
receiving a first set of information from the tethered computing device during a first tethered connection of the series of tethered connections;
determining, responsive to the first set of information, a first parameter associated with a first synchronization period of a subsequent connection during which the tethered computing device uses the network connection to synchronize data between the tethered computing device and the another computing device connected to the telecommunications network, the first parameter comprising a start time for the first synchronization period;
providing the first parameter of the first synchronization period to the tethered computing device over the first tethered connection;
generating a second set of credentials for the subsequent connection that remain valid for the first synchronization period of the subsequent connection;
providing the second set of credentials to the tethered computing device over the first tethered connection;
disabling the first tethered connection;
establishing a first synchronization wireless access point responsive to the first parameter through which the tethered computing device establishes a second tethered connection of the series of tethered connections to access the network connection; and
receiving a second request from the tethered computing device over the first synchronization wireless access point to establish the second tethered connection; and,
establishing the second tethered connection if the second request includes the second set of credentials.

8. The article of manufacture of claim 7 wherein the computer storage medium comprises a server configured for communication with the mobile communication device over the telecommunications network.

9. The article of manufacture of claim 7 wherein the computer program further includes code for determining a second parameter associated with the first synchronization period, the second parameter comprising a duration of the first synchronization period.

10. The article of manufacture of claim 7 wherein the computer program further includes code for determining a second parameter associated with the first synchronization period, the second parameter comprising a data transfer limit during the first synchronization period.

11. The article of manufacture of claim 7 wherein the computer program further includes code for:
   determining a start time for a second synchronization period during which the tethered computing device uses the network connection to synchronize data between the tethered computing device and the another computing device; and,
   establishing a second synchronization wireless access point responsive to the start time for the second synchronization period through which the tethered computing device establishes a third tethered connection of the series of tethered connections to access the network connection.

12. A method for enabling synchronization of data between a tethered computing device and another computing device over a telecommunications network using a mobile communications device, the mobile communication device including a first network interface configured for connection to the telecommunications network to establish a network connection with the telecommunications network and a second network interface configured for connection to the tethered computing device to establish a series of tethered connections with the tethered computing device and permit the tethered computing device to use the network connection, the method comprising the steps of:
   receiving a first set of information from the tethered computing device during a first tethered connection of the series of tethered connections;
   determining, responsive to the first set of information, a first parameter associated with a first synchronization period of a subsequent connection during which the tethered computing device uses the network connection to synchronize data between the tethered computing device and the another computing device connected to the telecommunications network, the first parameter comprising a start time for the first synchronization period;
   providing the first parameter of the first synchronization period to the tethered computing device over the first tethered connection;
   generating a second set of credentials for the subsequent connection that remain valid for the first synchronization period of the subsequent connection;
   providing the second set of credentials to the tethered computing device over the first tethered connection;
   disabling the first tethered connection;
   establishing a first synchronization wireless access point responsive to the first parameter through which the tethered computing device establishes a second tethered connection of the series of tethered connections to access the network connection;
   receiving a second request from the tethered computing device over the first synchronization wireless access point to establish the second tethered connection; and,
   establishing the second tethered connection if the second request includes the second set of credentials.

13. The method of claim 12 further comprising the step of determining a second parameter associated with the first synchronization period, the second parameter comprising a duration of the first synchronization period.

14. The method of claim 12 further comprising the step of determining a second parameter associated with the first synchronization period, the second parameter comprising a data transfer limit during the first synchronization period.

15. The method of claim 12 further comprising the steps of
   determining a start time for a second synchronization period during which the tethered computing device uses the network connection to synchronize data between the tethered computing device and the another computing device; and,
   establishing a second synchronization wireless access point responsive to the start time for the second synchronization period through which the tethered computing device establishes a third tethered connection of the series of tethered connections to access the network connection.

\* \* \* \* \*